(12) United States Patent
Kurowski

(10) Patent No.: US 8,206,587 B2
(45) Date of Patent: Jun. 26, 2012

(54) FILTRATION CELL AND FILTRATION DEVICE USING SUCH A CELL

(75) Inventor: Serge Kurowski, Neuville-en-Condroz (BE)

(73) Assignee: Prayon Technologies, Engis (BE)

( * ) Notice: Subject to any disclaimer, the term of this patent is extended or adjusted under 35 U.S.C. 154(b) by 379 days.

(21) Appl. No.: 12/449,615

(22) PCT Filed: Mar. 6, 2008

(86) PCT No.: PCT/EP2008/052710
§ 371 (c)(1), (2), (4) Date: Aug. 17, 2009

(87) PCT Pub. No.: WO2008/110495
PCT Pub. Date: Sep. 18, 2008

(65) Prior Publication Data
US 2010/0101992 A1  Apr. 29, 2010

(30) Foreign Application Priority Data

Mar. 8, 2007 (BE) .................................. 2007/0099

(51) Int. Cl.
*B01D 33/00* (2006.01)
(52) U.S. Cl. ........ 210/330; 210/324; 210/328; 210/331; 210/344; 210/345
(58) Field of Classification Search .................. 210/330, 210/345, 331, 328, 344
See application file for complete search history.

(56) References Cited

U.S. PATENT DOCUMENTS

| 3,389,800 A | 6/1968 | Roos |
| 4,675,107 A | 6/1987 | Chamberlain |
| 6,116,431 A * | 9/2000 | Barloy .......................... 210/455 |
| 2004/0238439 A1 | 12/2004 | Oglesby |

OTHER PUBLICATIONS

International Search Report in PCT/EP2008/052710 dated May 28, 2008.

* cited by examiner

Primary Examiner — Benjamin Kurtz
(74) Attorney, Agent, or Firm — McCracken & Frank LLC

(57) ABSTRACT

The invention relates to a filtration cell that comprises a tank with a bottom wall (2) and four side walls extending upwards from the bottom wall as well as an upward opening, the four side walls including two opposite longitudinal walls (3, 5) as well as a front facing wall (4) and a rear facing wall connecting them, a filtration bed (7) supported in the tank, an outlet opening for discharging the filtrate, and a covering flap (24) protruding outwards from the top of one of said longitudinal walls, the longitudinal wall (5) opposed to that fitted with the flap including a lower portion (25) extending upwards from the bottom wall (2) and an upper portion (26) extending slantedly upwards and inside the tank from the top of said lower portion (25), and/or the front facing wall (4) comprises a bottom portion (27) extending upwards from the bottom wall (2) and a top portion (28) extending slantedly upwards and inside the tank from the top of said bottom portion (27).

19 Claims, 4 Drawing Sheets

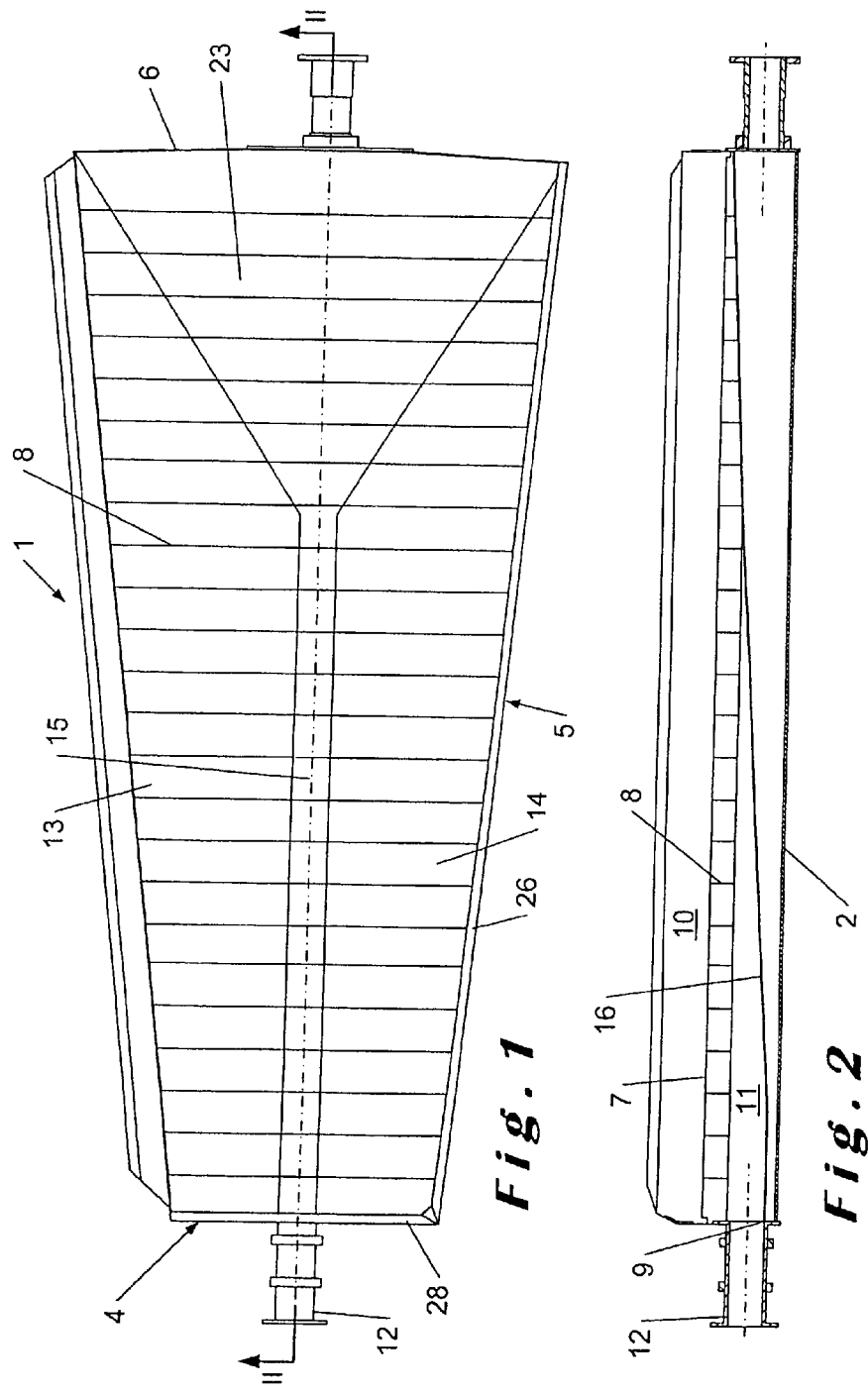

FILTRATION CELL AND FILTRATION DEVICE USING SUCH A CELL

The present invention relates to a filtration cell, comprising:
- a vessel comprising a bottom wall and four lateral walls that extend upwards from the bottom wall and an upward opening, the four lateral walls comprising two opposite longitudinal walls and, connecting these to each other, a front-facing wall and a rear-facing wall longer than the front-facing wall,
- a filtration bed supported in the vessel and dividing the latter into an upper compartment for receiving a material to be filtered introduced through the said opening and a lower compartment for receiving a filtrate,
- an outlet orifice disposed in the lower compartment for discharging the drained filtrate on the bottom wall, and
- a covering flap that projects outwards from the top of one of the said longitudinal walls.

Filtration devices with cells disposed in a carousel have been known for a long time. These devices are used for filtering suspensions, and are used in particular in the production of phosphoric acid (see for example U.S. Pat. No. 3,389,800 or BE 768591).

In these known devices, in plan view, the filtration cells, approximately trapezoidal in shape, turn in a carousel about a rotation axis. At a given moment, they are tilted about a radial axis to allow discharge of the filtration cake and washing of the cell.

Given this tilting about a horizontal radial axis, a sufficient space between the adjoining cells must be provided to allow the aforementioned tilting, without catching between these cells (see in particular BE 768591).

The result is a loss of filtration surface and therefore capacity of the device. Moreover, splashing or spattering of suspension or liquid for washing the filtration cake may occur between adjoining cells, which also represents a loss and results in damage to the cells and underlying equipment by these liquids, which are often particularly corrosive. This also gives rise to undesirable maintenance costs.

To remedy these problems, a covering flap, which projects outwards so as to cover the upper edge of a longitudinal wall of an adjoining cell during the carousel, has already been provided along the upper edge of one of the longitudinal walls of each cell. The space between adjoining cells is thus protected and any suspension coming out of the cells is returned to these by the covering flaps (see for example U.S. Pat. No. 3,389,800). In this patent, provision has also been made for the opposite longitudinal walls to extend upwards from the bottom wall slantingly towards the outside of the cell, which facilitates the discharge of the cake from the cells (see also EP 0426794 B1).

This arrangement does however have the drawback of reducing the filtration surface within the cell, for the same upper opening thereof.

To remedy this drawback, provision has already been made to arrange the longitudinal wall opposite to that provided with a covering flap so that it extends upwards from the bottom wall slantingly towards the inside of the cell (see for example U.S. Pat. No. 4,675,107). This arrangement allows easy tilting of the cells while keeping a filtration surface identical to that of the cells with straight longitudinal walls. It must however be remarked that, in the acute angle formed between a longitudinal wall and the bottom wall, discharge of the filtration cake will be difficult or even incomplete in the tilted position, and washing of the filter bed will not be very effective.

The aim of the present invention is to overcome the drawbacks mentioned above by proposing a filtration cell affording simultaneously easy tilting, a filtration surface with a large surface area, discharge of the filtration cake without problem and good washing of the filter bed. Advantageously this filtration cell will even allow, for the same top opening as standard cells, an appreciable increase in the filtration surface.

These problems are resolved according to the invention by means of a filtration cell as indicted at the beginning, in which
- the longitudinal wall opposite to the one provided with a covering flap comprises a lower part that extends upwards from the bottom wall and an upper part that extends slantingly upwards and towards the inside of the vessel from the top of the said lower part, and/or
- the front-facing wall comprises a bottom part that extends upwards from the bottom wall and a top part that extends slantingly upwards and towards the inside of the vessel from the top of the said bottom part.

As can be seen, the filter bed situated under an upward opening of the cell can thus be extended on at least one side, which increases the filtration surface of the cell compared with a cell with straight walls. The gain in surface area can be as much as between 5% and 10% compared with a cell composed of walls extending upwards at an angle of 90° with respect to the filter bed. Moreover, the inwardly inclined arrangement of the upper part of the longitudinal wall opposite to the one provided with a covering flap and/or the top part of the front-facing wall allows rotation of the cell about its horizontal radial axis without mishap and without having to move away the adjoining filtration cells.

According to a preferred embodiment of the invention, the said lower part is vertical and the said upper part is inclined inwards with respect to the said lower part by an angle of between 15° and 30°. Likewise, advantageously, the said bottom part is vertical and the said top part is inclined inwards with respect to the said bottom part by an angle of between 15° and 30°.

According to an advantageous embodiment of the invention, the said top part of the front-facing wall and the said upper part of the longitudinal wall opposite to the one provided with a covering flap are connected, forming between them a cant. This arrangement enlarges the cell towards the front, that is to say towards the centre of the filtration device, without causing problems of tilting when the cells have to be turned over.

The longitudinal wall provided with a covering flap can extend vertically upwards from the bottom wall. It can also if necessary be envisaged according to the invention that it comprises an under part that extends upwards from the bottom wall and an over part that extends slantingly upwards and towards the inside of the vessel from the top of the said under part. In this case, preferably the said under part is vertical and the said over part is inclined inwards with respect to the said under part by an angle of between 15° and 30°.

According to an improved embodiment of the invention, the said filter bed is supported in the vessel along the said four lateral walls, the filter bed being connected to the said longitudinal wall opposite to the one provided with a covering flap below the top of its lower part that is vertical, and/or the said front wall below the top of its bottom part that is vertical, and possibly the said longitudinal wall provided with a covering flap below the top of its under part that is vertical. This arrangement of the filter bed allows easy detachment of the filtration cake from the filtering surface, since the latter is surrounded by vertical wall parts. The wall parts inclined inwards begin only at a certain distance above the filter bed, and preferentially above the surface of the filtration cake, and therefore do not represent an impediment to the detachment of the filtration cake and the washing of the filter bed, in the tilted position of the cell.

Other embodiments of a filtration cell according to the invention are indicated in the accompanying claims.

The invention also concerns a filtration device comprising at least one filtration cell according to the invention.

Other details and particularities of the invention will emerge from the description given below, non-limitatively and with reference to the accompanying drawings.

FIG. 1 shows a plan view of a filtration cell according to the invention.

FIG. 2 shows a view in longitudinal section along the line II-II in FIG. 1.

Figure 6:
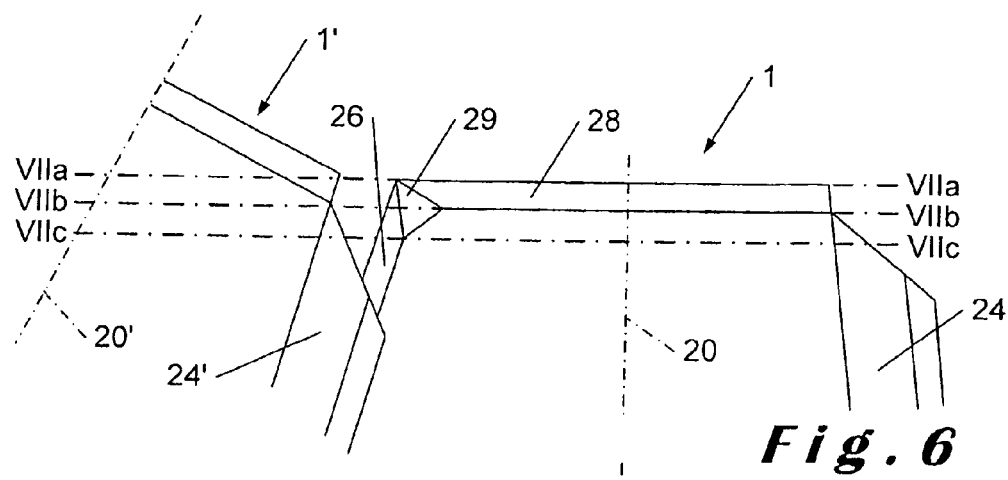
FIG. 6 shows a partial schematic view in plan of the top of two adjacent filtration cells according to the invention.
Figure 7A:
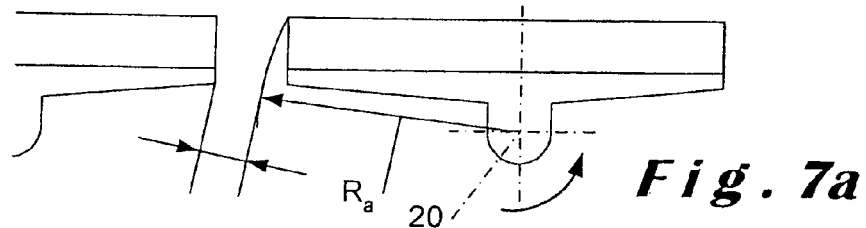
Figure 7B:
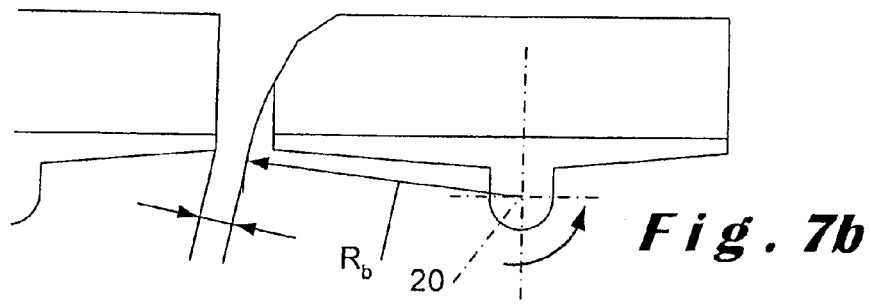
Figure 7C:
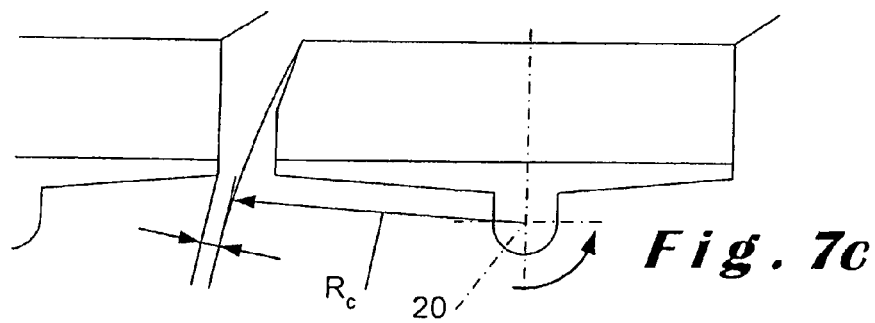

FIGS. 7a, 7b, and 7c are views in section of FIG. 6 taken along the lines VIIa, VIIb and VIIc thereof.

Figure 8:
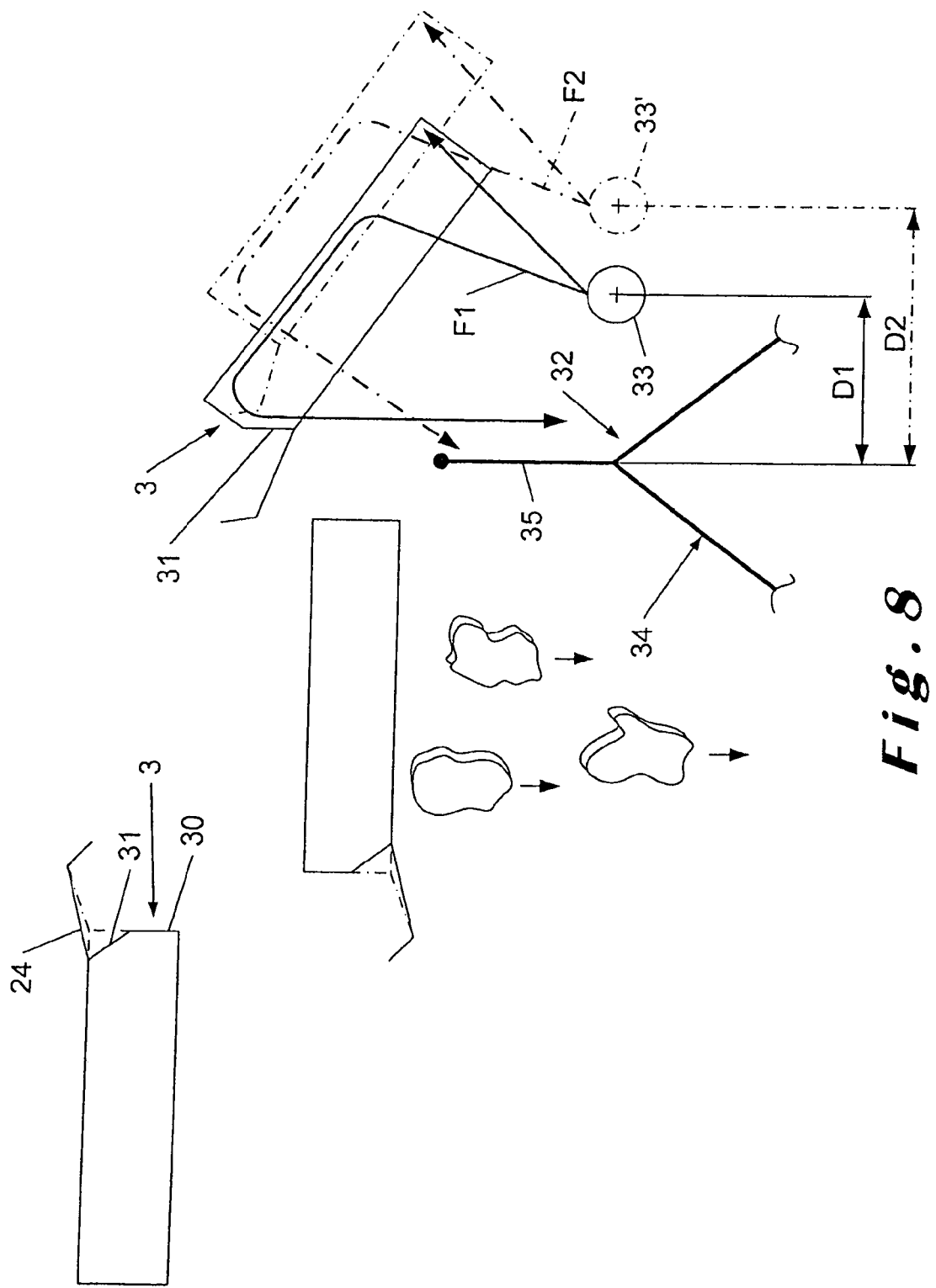

FIG. 8 shows a schematic view, developed in a plane, of cells according to the invention at the time of tilting and washing thereof, this view being taken from the outside of the filtration device.

In the various figures, identical or analogous elements bear the same reference signs.

Figure 3:
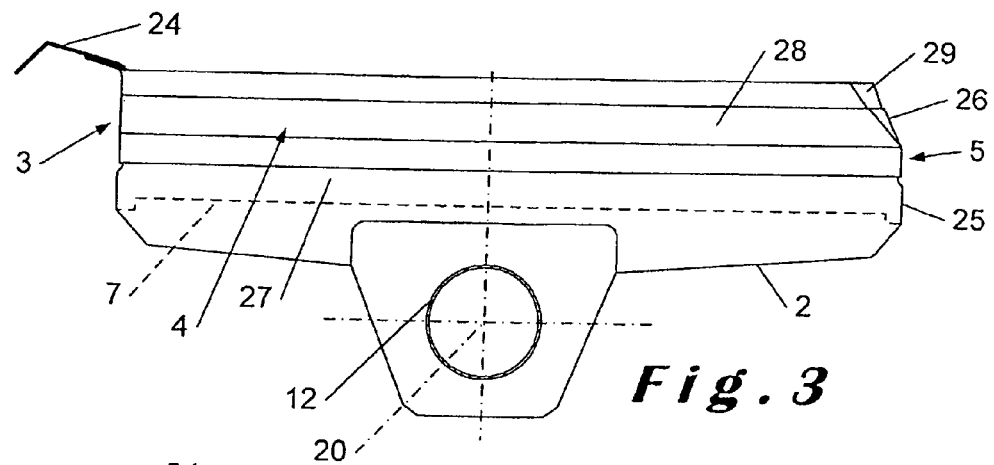
FIG. 3 shows a view in elevation of the front of the cell shown in FIGS. 1 and 2.

As is clear from the example of the filtration cell according to the invention illustrated in FIGS. 1 to 3, this cell comprises a vessel designated by the general reference 1, comprising a bottom wall 2, lateral walls extending upwards from the bottom wall 2 and an upward opening. The four lateral walls comprises two opposite longitudinal walls 3 and 5 and, connecting these to each other, a front-facing wall 4 and a rear-facing wall 6 longer than the front-facing wall. In plan view, this cell therefore has an approximately trapezoidal shape, or the shape of a sector of a polygon, because it is designed to be disposed alongside other similar cells with a view to forming a continuous filtration apparatus turning like a carousel. It must be understood that the cell according to the invention is limited neither to this form, nor to use in such equipment.

Figure 4:
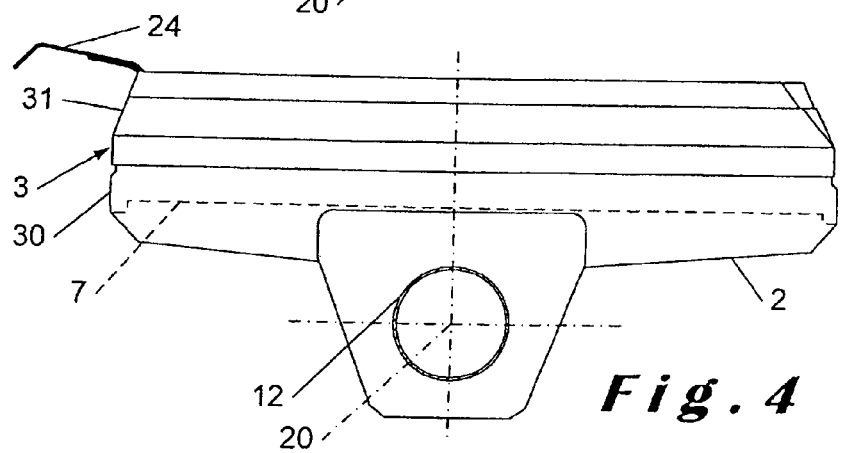
FIG. 4 shows a view in elevation of the front of a variant embodiment of a cell according to the invention.

The vessel 1 of such a filtration cell contains a filter bed 7, shown in FIG. 2 and, by a broken line, in FIGS. 3 and 4. Such a filter bed is known per se and is generally composed of a supporting lattice on which a layer of filter cloth rests. The supporting lattice is itself supported in a known manner in particular by ribs 8 that extend substantially transversely to the cell and that serve simultaneously as stiffeners.

The filter bed 7 divides the vessel 1 into a top compartment 10 for receiving the material to be filtered and a bottom compartment 11 for the filtrate.

As is clear in particular from FIG. 2, an outlet orifice 9 is provided at the bottom of the front-facing wall 4 for discharge of the filtrates through a discharge pipe 12.

The bottom wall of the vessel 1 supports two lateral flow sections 13 and 14, disposed on each side of a drainage channel 15, so as to be inclined downwards in the direction of the latter. These lateral flow sections 13 and 14 thus form two inclined planes that each have a slope oriented transversely to the drainage channel 15, this slope being able to be from 3° to 8°, preferably from 4° to 6°.

The drainage channel 15 itself has a bottom 16 inclined between its top end and its bottom end, which emerges facing the outlet orifice 9 described previously.

The cell shown here is designed to be tilted about an axis 20, with a view to removing the cake of filtered material, at the end of processing. Two bearings, not shown, support the cells so as to enable it to pivot about this axis. The discharge pipe 12 is connected to the orifice 9.

According to the invention, the bottom wall 2 supports an end section 23 that is disposed so as to be inclined downwards along the rear-facing wall 6, opposite to the wall 4 provided with the outlet orifice 9.

In the example illustrated in FIGS. 1 to 3, the longitudinal wall 3 is provided with a covering flap 24 that projects towards the outside from the top of this wall. This flap is designed to cover laterally part of the adjoining filtration cell (see FIG. 6). In this example, the flap is bent longitudinally so as to form an inverted V. In this way, any liquid arriving on the flap can float towards one or other of the adjoining cells, without getting lost between the cells and possible damaging the underlying equipment.

According to the example illustrated, the longitudinal wall 5, which is situated opposite to the one provided with a flap 24, comprises a lower part 25 that extends upwards from the bottom wall, preferably vertically, and a upper part 26 that extends slantingly upwards and towards the inside of the vessel from the top of the lower part 25. The inclination of the upper part 26 with respect to the lower part 25 can be between 15° and 30°; it is preferably 20°.

In this example also, the front-facing wall 4 comprises a bottom part 27 that extends upwards from the bottom wall, preferably vertically, and a top part 28 that extends slantingly upwards and towards the inside of the vessel from the top of the bottom part 27. The inclination of the top part 28 with respect to the bottom part 27 can be between 15° and 30°; it is preferably 20°.

The longitudinal wall 3 is, in this example, substantially vertical.

The upper part 26 and the top part 28 of the walls 5 and 4 are joined by a cant 29.

In the example illustrated in FIGS. 1 to 3, the filter bed 7 is supported in the vessel along the four walls 3 to 6. As can be seen in these figures the filter bed is connected to each of these walls in a substantially vertical part. The walls 3 and 6 are substantially vertical over their entire height. In addition, this filter bed is fixed to the substantially vertical lower part 25 of the wall 5 and to the substantially vertical bottom part 27 of the wall 4. In a position tilted by 180° about the axis 20, the surface of the filtration cake does not reach the bend between the substantially vertical parts and the parts inclined towards the inside of the walls. It can therefore be detached from the filter bed without any immediate obstacle, the parts of the wall inclined towards the inside 26, 27 and 28 being situated appreciably lower than the filter bed 7. The latter can also be cleaned by spraying a washing liquid onto its surface, without any difficulties due to dead angles that are difficult to reach.

As is clear from FIG. 4, it is possible to make provision in a variant embodiment of a filtration cell according to the invention for the longitudinal wall 3 provided with the flap 4 to comprise an under part 30 that extends upwards from the bottom wall, preferably substantially vertically, and an over part 31 that extends slantingly upwards and towards the inside of the vessel from the top of the under part 30. Preferably the inclination of the over part 31 with respect to the under part 30 is between 15° and 30°; it is preferably 20°.

In this embodiment also, the filter bed 7 is fixed to the longitudinal wall in the under part 30 thereof, which is substantially vertical, so that the filtration cake does not reach the bend between the substantially vertical under part and the part inclined towards the inside. Thus there is no interference to the detachment of the filtration cake in the tilted position of the cell.

Figure 5:
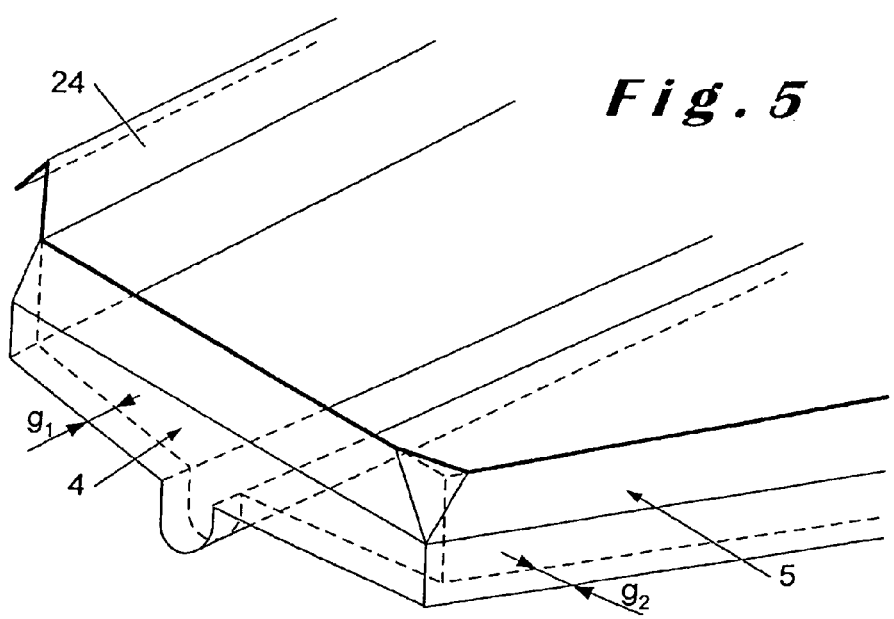
FIG. 5 shows a partial schematic view in perspective for comparing a cell according to the invention and a cell with straight walls according to the prior art.

FIG. 5 shows in solid lines a filtration cell according to the invention and in broken lines a filtration cell of the prior art having the same upward opening but provided with straight walls. An elongation g1 of the cell towards the centre of the filtration device and a broadening g2 of the side opposite to the flap can be seen. The filtration surface connected to the vertical parts of the lateral walls 3 to 6 of the cell can thus advantageously increase by 5% to 10%.

The vessel 1 illustrated in FIG. 6 is shown in a partial plan view with an adjoining vessel 1', the tilting axis 20' of which is situated aslant with respect to the tilting axis 20 of the vessel 1. The tilting of the vessel 1 in the anticlockwise direction is shown in sections 7a to 7c. The arcs of a circle followed by the vessel 1 at the various sections taken in FIG. 6 are indicated by the references Ra, Rb and respectively Rc. As can be seen the clearance between cells increases the closer to the centre of the filtration device and therefore the more the front part of the cell is extended towards this centre. The gain in surface area that results in this therefore has no negative effect on the possibilities of tilting of adjoining cells.

In the example embodiment illustrated in FIG. 8, cells having a front-facing wall according to the invention with simultaneously a longitudinal wall 3 provided with a flap 24 and having a bend between a substantially vertical bottom part 30 and a top part 31 inclined towards the inside are shown during tilting and cleaning thereof. In broken lines, a cell of the prior art with straight walls has been shown.

After tilting at 180°, there is what is called a dry discharge of the filtration cake into a solid-matter hopper 34 shown schematically. The vertical wall of this hopper serves as a separating partition 35 common to a washing-water hopper 32.

After the dry discharge, the cells return to their initial position. During this time the filter beds are cleaned by pressurised water sprayed by a washing manifold 33. The path of the washing water is illustrated by the arrow F1 for the cell according to the invention.

As can be seen along the longitudinal wall 3 with top part 31 bent towards the inside, the washing water leaves the filtration cell vertically downwards, which makes it possible to reduce the distance D1 between the manifold 33 and the separating partition 35 of the hoppers 30 and 32, compared with the distance D2 necessary for the washing of a filtration cell according to the prior art. This is because in the latter case the wall provided with a flap is straight, and the washing water leaves the filtration cell on the path illustrated by the arrow F2. As can be seen in FIG. 8, if it is wished to avoid an entry of washing liquid into the solids hopper 34, and to recover 100% of the washing water from the filter beds, it is necessary to move the washing manifold 33' away from the separating partition, as well as the position of the cells during cleaning thereof. The result is therefore once again a loss of space in the filtration device, which justifies the arrangement according to the invention of a wall on the flap side provided with a bend between the under part and the over part, as illustrated in FIG. 4.

It must be understood that the present invention is in no way limited to the embodiments described and that many modifications can be made thereto without departing from the scope of the accompanying claims.

It is possible for example to provide also a filtration cell with only the front-facing wall 4 or only the longitudinal wall 5 having a bend between a vertical part and a part inclined towards the inside, each of these embodiments if necessary being able to have simultaneously a longitudinal wall provided with a flap and also having such a bend.

The invention claimed:

1. Filtration cell, comprising
    a vessel comprising a bottom wall and four lateral walls that extend upwards from the bottom wall and an upward opening, the four lateral walls comprising two opposite longitudinal walls and, connecting these to each other, a front-facing wall and a rear-facing wall longer than the front-facing wall,
    a filtration bed supported in the vessel and dividing the latter into an upper compartment for receiving a material to be filtered introduced through the said opening and a lower compartment for receiving a filtrate,
    an outlet orifice disposed in the lower compartment for discharging the drained filtrate on the bottom wall, and
    a covering flap that projects outwards from the top of one of the said longitudinal walls;
    wherein the longitudinal wall opposite to the one provided with the covering flap comprises a lower part that extends upwards vertically from the bottom wall and an upper part that extends slantingly upwards and towards the inside of the vessel from the top of the said lower part, characterized in that
    wherein the front-facing wall comprises a bottom part that extends upwards vertically from the bottom wall and a top part that extends slantingly upwards and towards the inside of the vessel from the top of the said bottom part, and in that said filtration bed comprises, with respect to said upward opening, an increased filtering surface extended on the side of the longitudinal wall opposed to the one comprising said covering flap and on the front wall, and in that said filtration bed is supported in the vessel along the four lateral walls, the filtration bed being connected to the longitudinal wall opposite to the one provided with the covering flap below the top of its lower part and to the front wall below the top of its bottom part.

2. Filtration cell according to claim 1, wherein the lower part is vertical and the upper part is inclined towards the inside with respect to the lower part by an angle of between 15° and 30°.

3. Filtration cell according to claim 2, wherein the bottom part is vertical and the top part is inclined towards the inside with respect to the bottom part by an angle of between 15° and 30°.

4. Filtration cell according to claim 3, wherein the top part of the front-facing wall and the upper part of the longitudinal wall opposite to the one provided with the covering flap are connected, forming between them a cant.

5. Filtration cell according to claim 1, wherein the longitudinal wall provided with the covering flap extends vertically upwards from the bottom wall.

6. Filtration cell according to claim 5, wherein the longitudinal wall provided with the covering flap comprises an under part that extends upwards from the bottom wall and an over part that extends slantingly upwards and towards the inside of the vessel from the top of the bottom part.

7. Filtration cell according to claim 6, wherein the under part is vertical and the over part is inclined towards the inside with respect to the under part by an angle of between 15° and 30°.

8. Filtration cell according to claim 7, wherein the bottom wall comprises flow sections disposed so as to be inclined towards a drainage channel that emerges in the outlet orifice.

9. Filtration cell according to claim 8, wherein the filtration cell is supported so as to be able to pivot about a longitudinal axis extending horizontally below the filter bed of the cell, and between the front and rear thereof.

10. Filtration cell according to claim 9, wherein the filtration bed is connected to the longitudinal wall provided with the covering flap below the top of its under part that is vertical.

11. Filtration device comprising at least one filtration cell including:
- a vessel comprising a bottom wall and four lateral walls that extend upwards from the bottom wall and an upward opening, the four lateral walls comprising two opposite longitudinal walls and, connecting these to each other, a front-facing wall and a rear-facing wall longer than the front-facing wall,
- a filtration bed supported in the vessel and dividing the latter into an upper compartment for receiving a material to be filtered introduced through the opening and a lower compartment for receiving a filtrate,
- an outlet orifice disposed in the lower compartment for discharging the drained filtrate on the bottom wall, and
- a covering flap that projects outwards from the top of one of the said longitudinal walls
- wherein the longitudinal wall opposite to the one provided with the covering flap comprises a lower part that extends upwards vertically from the bottom wall and an upper part that extends slantingly upwards and towards the inside of the vessel from the top of the lower part, characterized in that
- wherein the front-facing wall comprises a bottom part that extends upwards vertically from the bottom wall and a top part that extends slantingly upwards and towards the inside of the vessel from the top of the bottom part; and in that said filtration bed comprises, with respect to said upward opening, an increased filtering surface extended on the side of the longitudinal wall opposed to the one comprising said covering flap and on the front wall, and in that said filtration bed is supported in the vessel along the four lateral walls, the filtration bed being connected to the longitudinal wall opposite to the one provided with the covering flap below the top of its lower part and to the front wall below the top of its bottom part.

12. Filtration device according to claim 11, wherein the longitudinal wall opposite to the one provided with the covering flap comprises a lower part that extends upwards from the bottom wall and an upper part that extends slantingly upwards and towards the inside of the vessel from the top of the said lower part, and wherein the front-facing wall comprises a bottom part that extends upwards from the bottom wall and a top part that extends slantingly upwards and towards the inside of the vessel from the top of the said bottom part.

13. Filtration device according to claim 11, wherein the lower part is vertical and the upper part is inclined towards the inside with respect to the lower part by an angle of between 15° and 30°.

14. Filtration device according to claim 13, wherein the bottom part is vertical and the top part is inclined towards the inside with respect to the bottom part by an angle of between 15° and 30°.

15. Filtration device according to claim 14, wherein the top part of the front-facing wall and the upper part of the longitudinal wall opposite to the one provided with the covering flap are connected, forming between them a cant.

16. Filtration device according to claim 11, wherein the longitudinal wall provided with the covering flap extends vertically upwards from the bottom wall.

17. Filtration device according to claim 16, wherein the longitudinal wall provided with the covering flap comprises an under part that extends upwards from the bottom wall and an over part that extends slantingly upwards and towards the inside of the vessel from the top of the bottom part.

18. Filtration device according to claim 17, wherein the under part is vertical and the over part is inclined towards the inside with respect to the under part by an angle of between 15° and 30°.

19. Filtration cell according to claim 1, wherein the longitudinal wall opposite to the one provided with the covering flap comprises a lower part that extends upwards from the bottom wall and an upper part that extends slantingly upwards and towards the inside of the vessel from the top of the said lower part, and wherein the front-facing wall comprises a bottom part that extends upwards from the bottom wall and a top part that extends slantingly upwards and towards the inside of the vessel from the top of the said bottom part.

* * * * *